United States Patent

Troiano

[11] Patent Number: 6,105,459
[45] Date of Patent: Aug. 22, 2000

[54] CABLE LOCK AND RELEASE APPARATUS

[75] Inventor: Thomas Jackson Troiano, Novi, Mich.

[73] Assignee: Ford Motor Company, Dearborn, Mich.

[21] Appl. No.: 09/210,676

[22] Filed: Dec. 14, 1998

[51] Int. Cl.[7] .................................................. B60T 7/04
[52] U.S. Cl. ................... 74/542; 74/529; 74/512
[58] Field of Search .......................... 74/540, 541, 542, 74/529, 512, 535, 575, 577 R, 578

[56] References Cited

U.S. PATENT DOCUMENTS

| | | |
|---|---|---|
| 3,602,064 | 8/1971 | Francis . |
| 3,625,087 | 12/1971 | Flory et al. . |
| 4,364,284 | 12/1982 | Tani et al. . |
| 4,872,368 | 10/1989 | Porter ..................................... 74/512 X |
| 5,131,288 | 7/1992 | Barlas ........................................ 74/512 |
| 5,588,335 | 12/1996 | Strait ......................................... 74/512 |
| 5,775,174 | 7/1998 | Kanbe et al. ........................... 74/535 X |

*Primary Examiner*—Mary Ann Battista
*Attorney, Agent, or Firm*—Gregory P. Brown

[57] ABSTRACT

A cable lock and release apparatus significantly reduces release efforts in cable lock mechanisms, as used in parking brake systems of a motor vehicle. The apparatus includes a cable actuator (20) rotatably disposed on a cable actuator shaft (26) and having a cable (22) attached to it. The cable actuator (20) includes a sector (28) having a plurality of sector teeth (30). A pawl member (32) includes a slotted pawl aperture (36) allowing rotation and translation of the pawl member about a pawl member shaft (31). A pawl tooth (34) is disposed on the pawl member for engagement with the plurality of sector teeth. A release means is provided for maintaining the pawl tooth in an engaged relationship with the plurality of sector teeth with the cable in the high tension position and releasing the pawl tooth from the engaged relationship with the plurality of sector teeth allowing the cable to return to the low tension position.

3 Claims, 3 Drawing Sheets

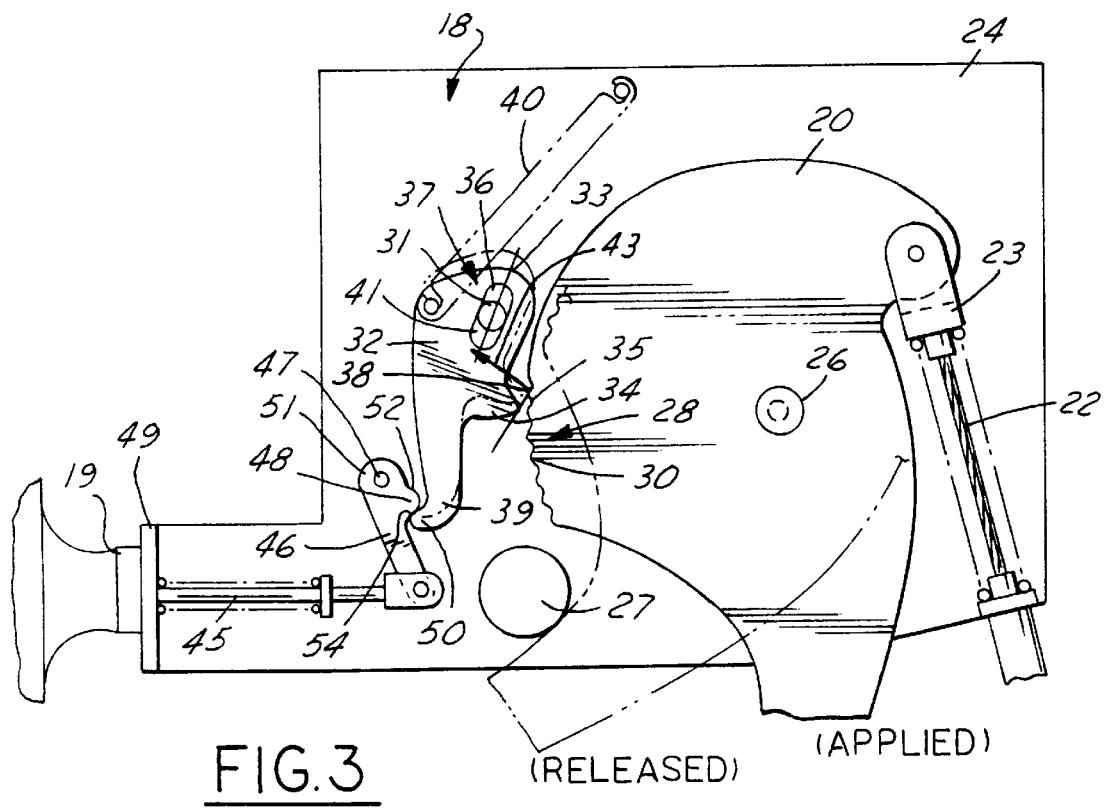
FIG. 3 (RELEASED) (APPLIED)
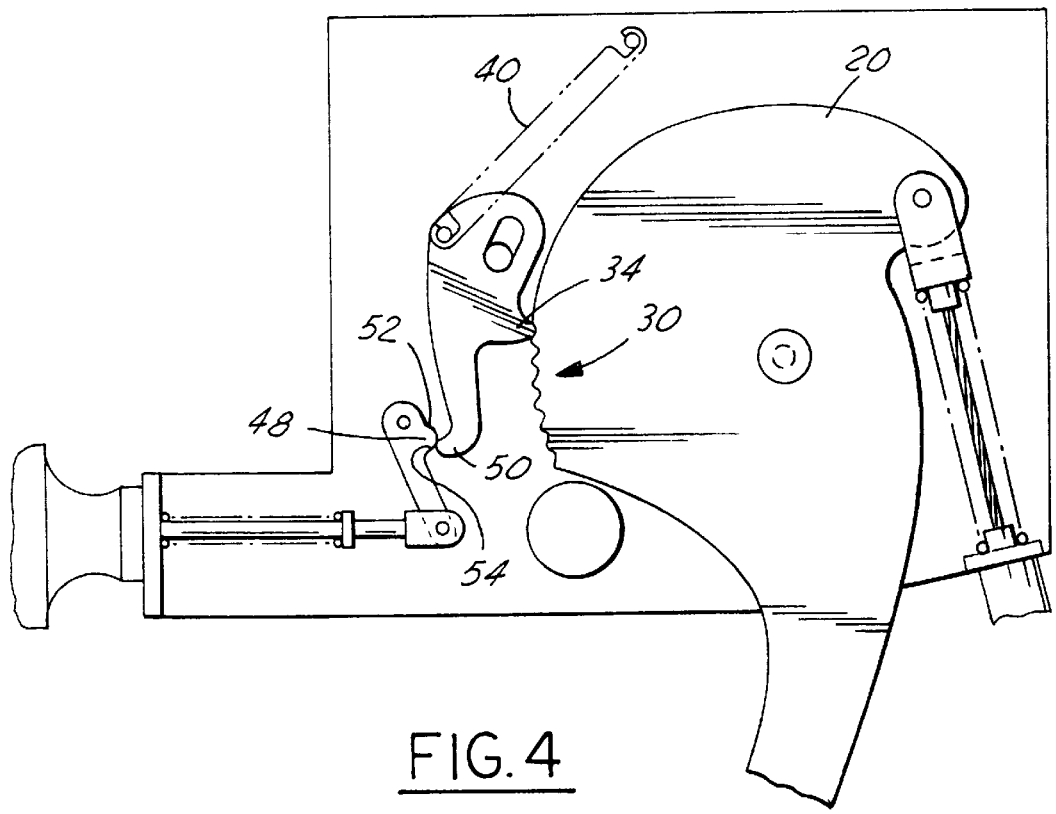
FIG. 4

CABLE LOCK AND RELEASE APPARATUS

BACKGROUND OF THE INVENTION

1. Field of the Invention

This invention relates generally to cable lock and release mechanisms as found on motor vehicle parking brake systems. More particularly, the present invention relates to a cable lock and release mechanism that allows reduced parking brake system release efforts.

2. Disclosure Information

A common application for a cable lock and release mechanism can be found in a parking brake for a motor vehicle. Parking brake release mechanisms often employ a pawl/sector ratchet mechanism to lock the parking brake cable in a high tension, applied position. These systems require high release efforts because during the initial pull of a release lever by an operator, the sector must rotate a small distance in the apply direction, increasing the parking brake cable tension, before the pawl can disengage and the parking brake actuator can rotate to a low tension, released position. Therefore, the higher the tension in the parking brake, the higher the required release efforts. The resulting high release efforts are the source of customer dissatisfaction and prevent the implementation of lower cost automatic parking brake release actuators.

It would therefore be desirable to provide a cable lock and release mechanism having considerably lower release efforts than presently available on parking brake systems.

SUMMARY OF THE INVENTION

According to the present invention, a cable lock and release mechanism has been discovered which reduces the required effort to release the cable from a locked condition. The cable lock and release mechanism includes a cable actuator rotatably disposed on a cable actuator shaft and having a cable attached to it. The cable actuator is operative to displace the cable between low tension and high tension positions. A sector, disposed on the cable actuator, includes a plurality of sector teeth.

The cable lock and release mechanism also includes a pawl member having a pawl aperture disposed in a first end and being slotted along a longitudinal axis. The pawl aperture allows rotation and translation of the pawl member about a pawl member shaft. A pawl tooth is disposed on the pawl member for engagement with the plurality of sector teeth.

The cable lock and release mechanism also includes a release device for maintaining the pawl tooth in an engaged relationship with the plurality of sector teeth with the cable in the high tension position and releasing the pawl tooth from the engaged relationship with the plurality of sector teeth allowing the cable to return to the low tension position.

Advantageously, the cable lock and release mechanism of the present invention significantly reduces the effort required to release the locked cable from a high tension position.

BRIEF DESCRIPTION OF THE DRAWINGS

FIG. 3 is a side elevational view of a cable lock and release apparatus moving from a low tension, released position to a high tension, applied position in accordance with the present invention.

FIG. 4 is a side elevational view of a cable lock and release apparatus in a high tension, applied position in accordance with the present invention.

DETAILED DESCRIPTION OF THE PREFERRED EMBODIMENT

Figure 1:
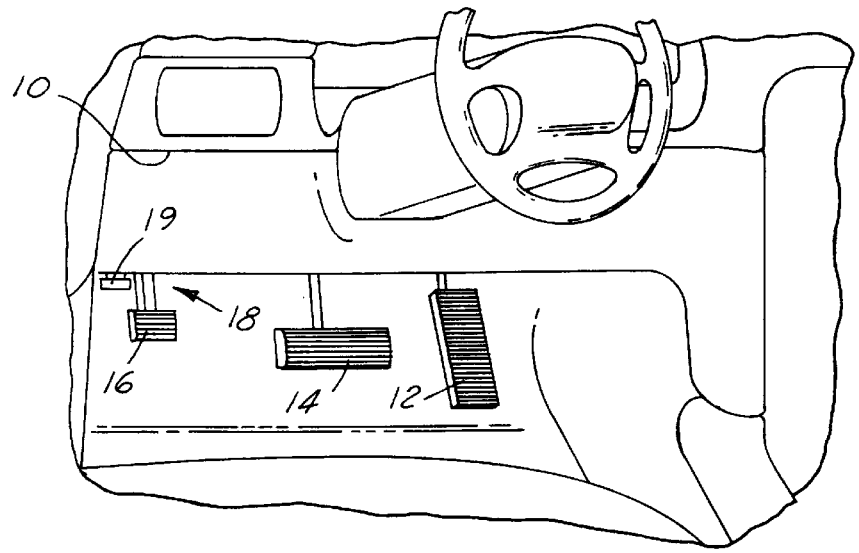
FIG. 1 is a partial view of an interior of a motor vehicle showing various operator controls.

Referring now to FIG. 1, an interior of a motor vehicle 10 having an accelerator pedal pad 12, a hydraulic brake pedal pad 14, and a parking brake pedal pad 16 is shown. Typically, an operator actuates the parking brake by stepping on the parking brake pedal pad 16 attached to a cable lock and release mechanism 18 and disengages the parking brake by retracting or pulling a release actuator 19 to disengage the cable lock and release mechanism 18.

Figure 2:
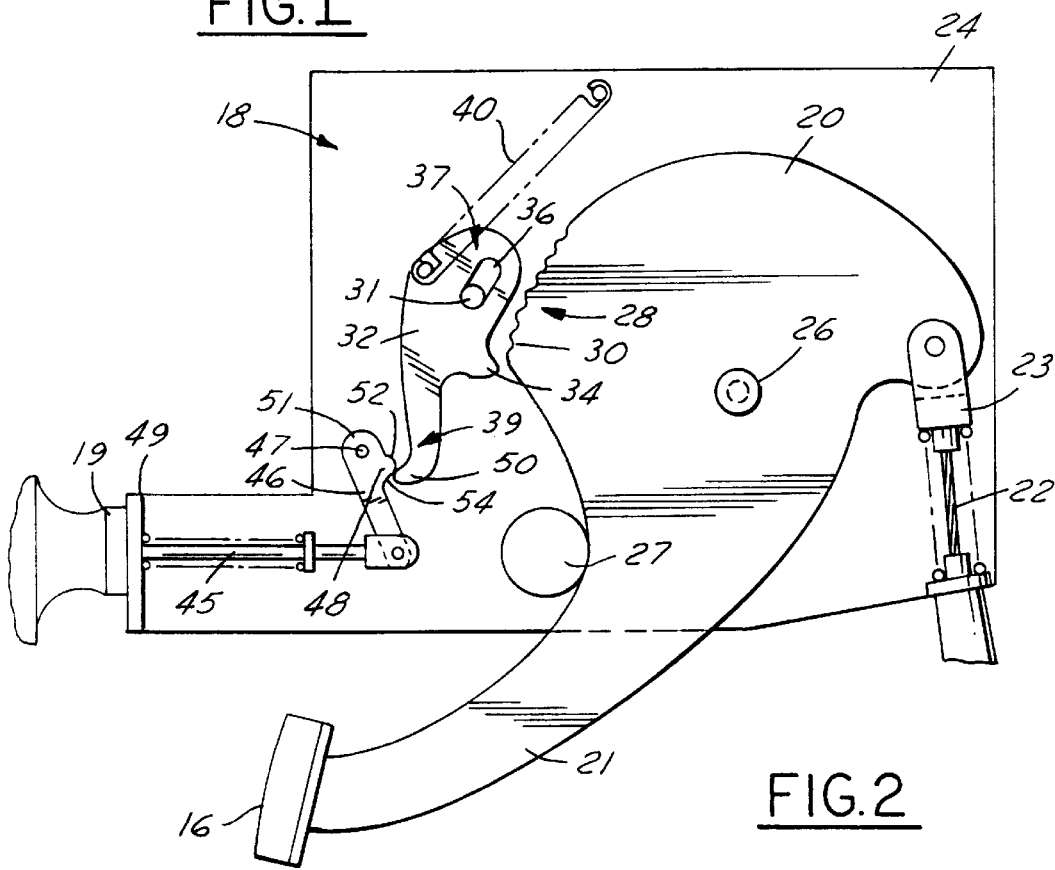
FIG. 2 is a side elevational view of a cable lock and release apparatus in a low tension, released position in accordance with the present invention.

Referring now to FIGS. 2 and 3, a cable actuator 20 is rotatably attached to a fixed structural member 24, such as a hinge pillar of a motor vehicle, by a cable actuator shaft 26. It should be recognized that the fixed structural member 24 could be a housing to be assembled within the vehicle. A stop 27 may be attached to the fixed structural member 24 to limit the range of motion of the cable actuator 20 in the counterclockwise direction. The cable actuator 20 is pivotally connected to a cable 22 by a clevis joint 23. The cable 22 operatively connects to the remainder of the parking brake system in a conventional manner. The cable actuator 20 displaces the cable 22 between low tension and high tension positions, which correspond to parking brake released and applied positions, respectively. Of course, it should be noted that the cable 22 can be replaced with any external flexible or inflexible inextensible member for transmitting motion.

The cable actuator 20 has an extended lever 21 that connects to the parking brake pedal pad 16 and allows the operator of the vehicle to engage the cable lock and release mechanism 18. A sector 28 of the cable actuator 20 includes a plurality of sector teeth 30 for matingly engaging a pawl tooth 34 disposed between a first end 37 and a second end 39 of a pawl member 32.

The pawl member 32 includes a pawl aperture 36 located in the first end 37 of the pawl member 32 allowing rotatable attachment to the fixed structural member 24 by a pawl shaft 31 in a position to allow the pawl tooth 34 to engage a single sector tooth of the plurality of sector teeth 30 at a predetermined point of engagement 35. The pawl aperture 36 on the pawl member 32 is slotted along a longitudinal axis 33 to allow the pawl member 32 to translate relative to the pawl shaft 31. A pawl spring 40 is connected between the pawl member 32 and the fixed structural member 24 and applies a disengaging force to the pawl member 32 as well as urging the pawl shaft 31 into a lower portion 41 of the pawl aperture 36. It should be recognized by those skilled in the art that the pawl spring 40, in the preferred embodiment, applies a clockwise torque, it being understood that many types of springs can be mounted in as many different ways, while still providing the equivalent disengaging force. The pawl member 32 also includes a follower 50 disposed on the second end 39 of the pawl member 32 for engagement with a cam 48.

The cam 48, which includes a release portion 52 and an apply portion 54, is formed on a first end 51 of a release lever 46. A release shaft 47 pivotally connects the first end 51 of the release lever 46 to the fixed structural member 24. The release lever 46 is rotated between the applied and released positions by displacement of the release actuator 19. Normally, the release actuator 19 is maintained in the released position by a release actuator spring 45, located between the release lever 46 and a flange 49 of the fixed structural member 24. It should be recognized that the manually operated release mechanism could be replaced with a low cost vacuum or electronic actuator to provide automatic parking brake release.

Referring now to FIGS. 2–5, operation of the present invention will now be described. Starting at FIG. 2, with the parking brake in the released position, the operator depresses the brake pedal pad 16 to actuate the parking brake. As shown in FIG. 3, the cable actuator 20 pivots about the cable actuator shaft 26 in a counterclockwise direction and the cable 22 moves from the low tension, released position to the high tension, applied position. As the cable actuator 20 pivots, the plurality of sector teeth 30 begin to engage the pawl tooth 34 at the point of engagement 35. Each sector tooth successively forces the pawl member 32 downward along the longitudinal axis 33 of the pawl aperture 36 to a point where the pawl tooth 34 disengages the single sector tooth. The amount of downward longitudinal displacement of the pawl member 32 necessary to disengage is determined by the relationship of the orientation of the longitudinal axis 33 of the pawl aperture 36 and an upper facing surface 38 of the single sector tooth. In the preferred embodiment, the longitudinal axis 33 lies substantially parallel to the upper facing surface 38. Next, the pawl spring 40 urges the pawl member 32 upward until the pawl tooth 34 engages the next sector tooth of the plurality of sector teeth 30.

As the operator depresses the brake pedal pad 16, the release actuator 19 is maintained in the closed position by the release actuator spring 45, which in turn maintains the apply portion 54 in contact with the follower 50. The apply portion 54 and the follower 50 allow the pawl member 32 to translate upward and downward along the longitudinal axis 33, while preventing the pawl member 32 from rotating clockwise under the disengaging force created by the pawl spring 40 and a reaction force 43 acting normal to the upper facing surface 38, and passing below the pawl shaft 31.

As shown in FIG. 4, when the operator ceases to apply force to the brake pedal pad, the pawl spring 40 together with the follower 50 engaged with apply portion 54 maintain the pawl tooth 34 in engagement with the plurality of sector teeth 30, locking the cable actuator 20 in the applied position.

Figure 5:
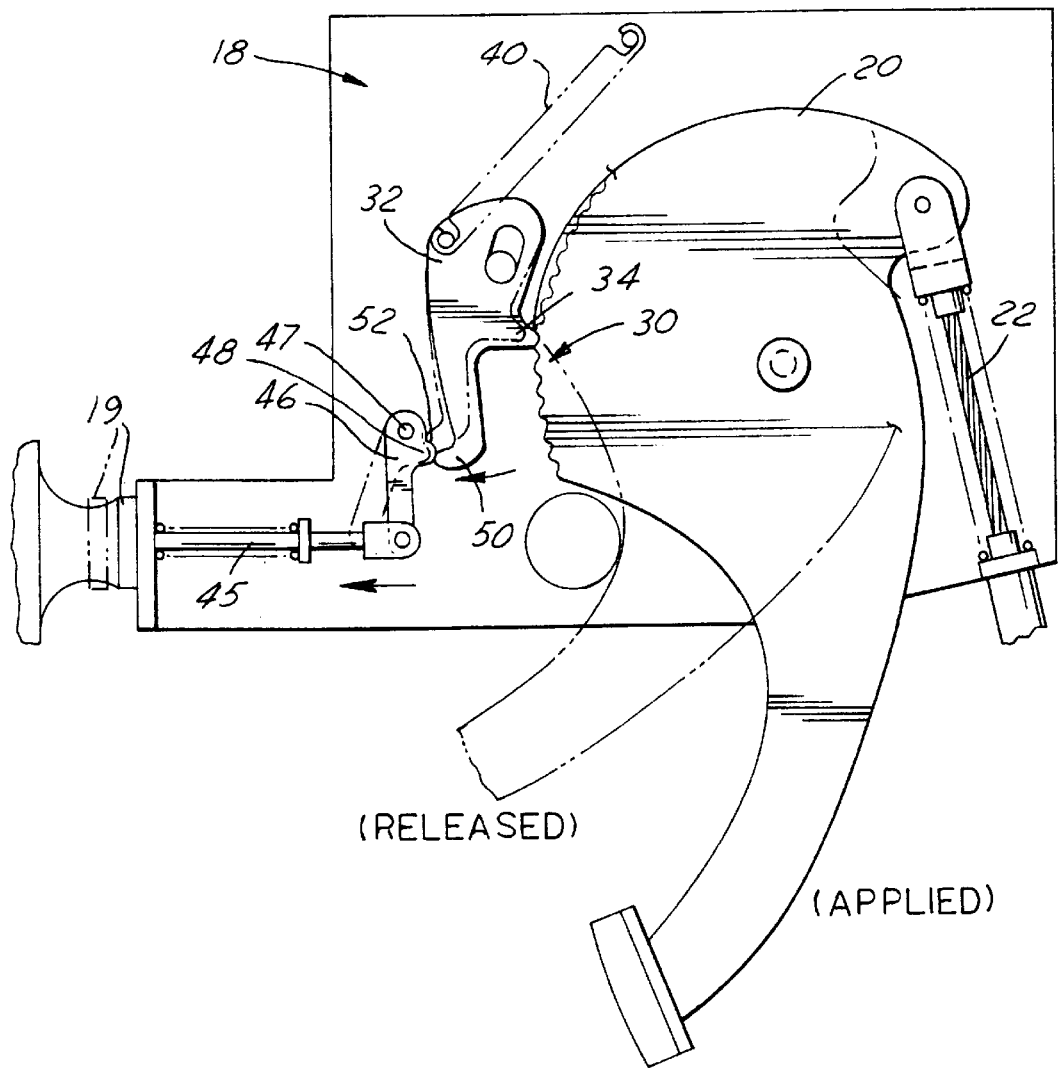
FIG. 5 is a side elevational view of a cable lock and release apparatus moving from a high tension, applied position to a low tension, released position in accordance with the present invention.

Referring now to FIG. 5, the operator pulls the release actuator 19, compressing the release actuator spring 45, and rotating the release lever 46 clockwise about the release shaft 47 from the applied position to the released position. This allows the follower 50 to follow the release portion 52 of the cam 48 under the force of the pawl spring 40. As the follower 50 follows the release portion 52, the pawl member 32 rotates in the clockwise direction, disengaging the pawl tooth 34 from the plurality of sector teeth 30, allowing the cable 22 and cable actuator 20 to return to the low tension, released position. It is significant to note that the cable actuator 20 is not rotated to cause disengagement. The effort necessary to disengage the cable lock and release mechanism 18 primarily consists of forces necessary to compress the release actuator spring 45 and, depending on the cam profile chosen, additionally the pawl spring 40, both of which can be selected to be considerably lighter than the springs in the parking brake mechanism.

The foregoing description presents a preferred embodiment of the present invention. Details of construction have been shown and described for purposes of illustration rather than limitation. For instance, it should be recognized that the cable lock and release mechanism can be applied to hand brake as well as other cable operated mechanisms requiring lock and release operation, such as winches, come-alongs and many others. In addition, sector lock and release mechanisms, such as those found on reclining seat backs, also benefit from the present invention. Other modifications and alterations of the invention will no doubt occur to those skilled in the art that will come within the scope and spirit of the following claims.

What is claimed:

1. A cable lock and release apparatus comprising:
   a cable actuator rotatably disposed on a cable actuator shaft and having a cable attached thereto, said cable actuator being operative to displace said cable between low tension and high tension positions;
   a sector disposed on said cable actuator, said sector including a plurality of sector teeth;
   a pawl member having a pawl aperture disposed in a first end thereof and being slotted along a longitudinal axis, said pawl aperture allowing rotation and translation of said pawl member about a pawl member shaft;
   a pawl tooth disposed on said pawl member for engagement with said plurality of sector teeth;
   a release actuator for maintaining said pawl tooth in an engaged relationship with said plurality of sector teeth with said cable in said high tension position and releasing said pawl tooth from said engaged relationship with said plurality of sector teeth allowing said cable to return to said low tension position, said release actuator including a follower disposed on a second end of said pawl member;
   a cam engaging said follower and being operative to rotate between an apply position and a release position, such that in said apply position said pawl member can translate along said longitudinal axis allowing said cable to be displaced into said high tension position and in said release position said pawl member can rotate to disengage said pawl tooth from said plurality of sector teeth allowing said cable to return to said low tension position, wherein said follower is constantly urged into engagement with said cam; and
   a release actuator urging mechanism constantly urging said release actuator into said apply position and allowing said release mechanism to be displaced into said release position upon application of a predetermined release effort.

2. The cable lock and release apparatus of claim 1, wherein said cam comprises:
   a release actuator;
   release actuator urging means for constantly urging said release actuator into said apply position and allowing said release actuator to be displaced into said release position upon application of a predetermined release effort;

a release lever pivotally disposed on a release shaft and operatively connected to said release actuator, said release lever also having a cam having a release portion and an apply portion thereof for engagement with a release portion of said follower and an apply portion on said follower, said apply portions of said cam and said follower being oriented so as to allow translation of said pawl member along said longitudinal axis and said release portions of said cam and said follower being operative to rotate said pawl member and said pawl tooth out of engagement with said plurality of sector teeth; and pawl member urging means for constantly urging said follower into engagement with said cam.

3. The cable lock and release apparatus of claim 1, wherein said longitudinal axis of said pawl aperture is oriented substantially parallel to an upper facing surface of a sector tooth engaged with said pawl tooth.

* * * * *